(12) United States Patent
Hatori

(10) Patent No.: US 6,822,678 B2
(45) Date of Patent: Nov. 23, 2004

(54) DIGITAL CAMERA, DIGITAL CAMERA CONTROL APPARATUS, DIGITAL CAMERA SYSTEM, DIGITAL CAMERA CONTROL METHOD, AND MEDIUM

(75) Inventor: Kenji Hatori, Hatogaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/904,450

(22) Filed: Jul. 31, 1997

(65) Prior Publication Data

US 2002/0149676 A1 Oct. 17, 2002

(30) Foreign Application Priority Data

Aug. 2, 1996 (JP) ............................................. 8-204656

(51) Int. Cl.$^7$ ........................... H04N 5/76; H04N 5/225
(52) U.S. Cl. .............................. 348/231.99; 348/231.2; 348/207.1
(58) Field of Search ................................ 348/231, 232, 348/233, 231.99, 231.3, 231.4, 231.5, 231.6, 231.7, 231.9, 231.2, 207.1, 552

(56) References Cited

U.S. PATENT DOCUMENTS 5,438,359 A * 8/1995 Aoki ....................... 348/231.9
5,867,214 A * 2/1999 Anderson et al. ........... 348/231
6,031,964 A * 2/2000 Anderson ................. 348/231.2

* cited by examiner

Primary Examiner—Aung Moe
Assistant Examiner—Luong T. Nguyen
(74) Attorney, Agent, or Firm—Fitzpatrick, Cella, Harper & Scinto

(57) ABSTRACT

Even after a file system has been changed by an external apparatus, a photographing operation and a recording operation can be normally performed by a digital camera constructed with a recording device which can be rewritten by an external digital camera control apparatus connected thereto and an information holding device for holding information regarding the recording device. The apparatus is arranged such that the information regarding the recording device is updated by reflecting the contents in the recording device by the information holding device in response to a request from the external digital camera control apparatus, so that when a photographing operation or a communication is performed, the contents in the recording device is always reflected to the information holding device.

6 Claims, 4 Drawing Sheets

DIGITAL CAMERA, DIGITAL CAMERA CONTROL APPARATUS, DIGITAL CAMERA SYSTEM, DIGITAL CAMERA CONTROL METHOD, AND MEDIUM

BACKGROUND OF THE INVENTION

1. Field of the Invention

The invention relates to a digital camera, a digital camera control apparatus, a digital camera system, a digital camera control method, and a medium which can be controlled by a communication.

2. Related Background Art

Hitherto, there has been proposed a digital camera system such that an image photographed by a digital camera is displayed or the like on a personal computer (hereinafter, simply referred to as a PC) or, contrarily, data managed on the PC is recorded to the digital camera.

FIG. 4 is a constructional diagram showing an outline of a digital camera system. In FIG. 4, reference numeral 1003 denotes a PC and 1007 indicates a digital camera. The digital camera 1007 has a PCMCIA card slot 1008 and can record images in a PCMCIA card (not shown).

Reference numeral 1006 denotes a cable to connect the PC 1003 and the digital camera 1007. A serial or parallel cable is used as a cable 1006. The PC 1003 performs a communication through the cable 1006 and can read the images recorded in the PCMCIA card of the digital camera 1007 or can write data into the PCMCIA card.

FIG. 5 is a block diagram showing a constructional example of the conventional digital camera 1007. In FIG. 5, reference numeral 1107 denotes hardware of the digital camera 1007 and 1100 indicates software. Only main portions of the digital camera 1007 are shown in FIG. 5.

In FIG. 5, reference numeral 1106 denotes an image pickup device comprising a CCD or the like which is necessary for image pickup. Reference numeral 1105 denotes a recording medium such as a PCMCIA card or the like to store the photographed image data or the like. Reference numeral 1104 denotes a file system having a function for enabling another software to perform an input/output process of the file without being aware of the hardware.

Reference numeral 1103 denotes a photographing information management unit having a function to manage various information which are necessary to perform a photographing. As information to be managed, there are the number of images which can be photographed and stored in the recording medium 1105, the number that is used as a name of image to be photographed at the next time, and the like.

Reference numeral 1101 denotes a photographing execution unit which functions such that the image pickup device 1106 is driven and photographing is performed, where the photographed images are recorded with names using serial numbers through the photographing information management unit 1103, and if the number of images which can be photographed and stored in the recording medium 1105 is insufficient, a decision is made so as not to perform the photographing operation or the like.

Reference numeral 1108 denotes a communication port. When communicating with the PC 1003 as shown in FIG. 4, the serial or parallel cable 1006 is connected to the communication port 1108. Reference numeral 1102 denotes a communication control unit which functions such that a signal transmitted from the communication port 1108 is processed, and in accordance with a request from the PC 1003, the photographed image is read through the file system 1104 and is transmitted, or unnecessary images are deleted, or data sent from the PC 1003 is written.

In the conventional digital camera system constructed as mentioned above, the PC 1003 can directly access the file system 1104 of the digital camera 1007 by communication via the cable 1006. For example, the images photographed by the digital camera 1007 can be deleted or a file other than the images can be written.

Therefore, in the case where a user intends to perform a photographing operation using the digital camera 1007 after an operation such as deleting photographed images or writing a file other than the images which has been executed by the PC 1003, there is a possibility that a contradiction may occur with the information which the photographing information management unit 1103 contains.

For example, it is assumed that when the images to which the names from No. 1 to No. 5 were allocated have been photographed and stored in the recording medium 1105, the photographing information management unit 1103 prepares No. 6 as a number that is used as a name of an image to be photographed at the next time.

In this instance, a case where the PC 1003 directly accesses the file system 1104 and deletes the image of No. 5 and, thereafter, performs a photographing operation is now considered. In this case, although it is inherently sufficient to photograph the image by the name of No. 5, since the photographing information management unit 1103 does not have means for detecting that the image of No. 5 was deleted, there is a problem such that the number that is used as a name of the image to be subsequently photographed cannot be changed and an image having the name of No. 6 is photographed.

Or, in the case where the digital camera 1007 intends to perform a photographing operation after the PC 1003 has written a file other than images into the recording medium 1105, in spite of a fact that a vacant capacity of the recording medium 1105 has been reduced, the photographing information management unit 1103 cannot detect it. There is, consequently, a fear that although the remaining unused capacity of the recording medium 1105 is actually insufficient, the photographing execution unit 1101 may execute a photographing operation.

SUMMARY OF THE INVENTION

In consideration of the above drawbacks, it is an object of the invention to enable storage means to be preferably managed.

Another object of the invention is to enable storage means of a digital camera to be preferably managed.

Still another object of the invention is to make it possible to manage storage means of a digital camera which is connected to a host computer.

A further object of the invention is to make it possible to normally perform photographing and recording operations using a digital camera even after a file system in the digital camera has been changed using an external apparatus such as a computer or the like.

To accomplish the above objects, according to a preferred embodiment of the invention, there is provided a digital camera comprising: recording means which can be rewritten from the outside; and information holding means for holding information regarding the recording means, wherein the information holding means updates the information regarding the recording means while reflecting the contents in the recording means.

In a system comprising a host computer and a digital camera, it is a further object of the present invention to provide a digital camera and host computer which make it possible to preferably manage storage means and to also provide a control method for controlling these apparatuses and a medium in which such a control method has been stored.

The above and other objects and features of the present invention will become apparent from the following detailed description and the appended claims with reference to the accompanying drawings.

DETAILED DESCRIPTION OF THE PREFERRED EMBODIMENTS

Figure 1:
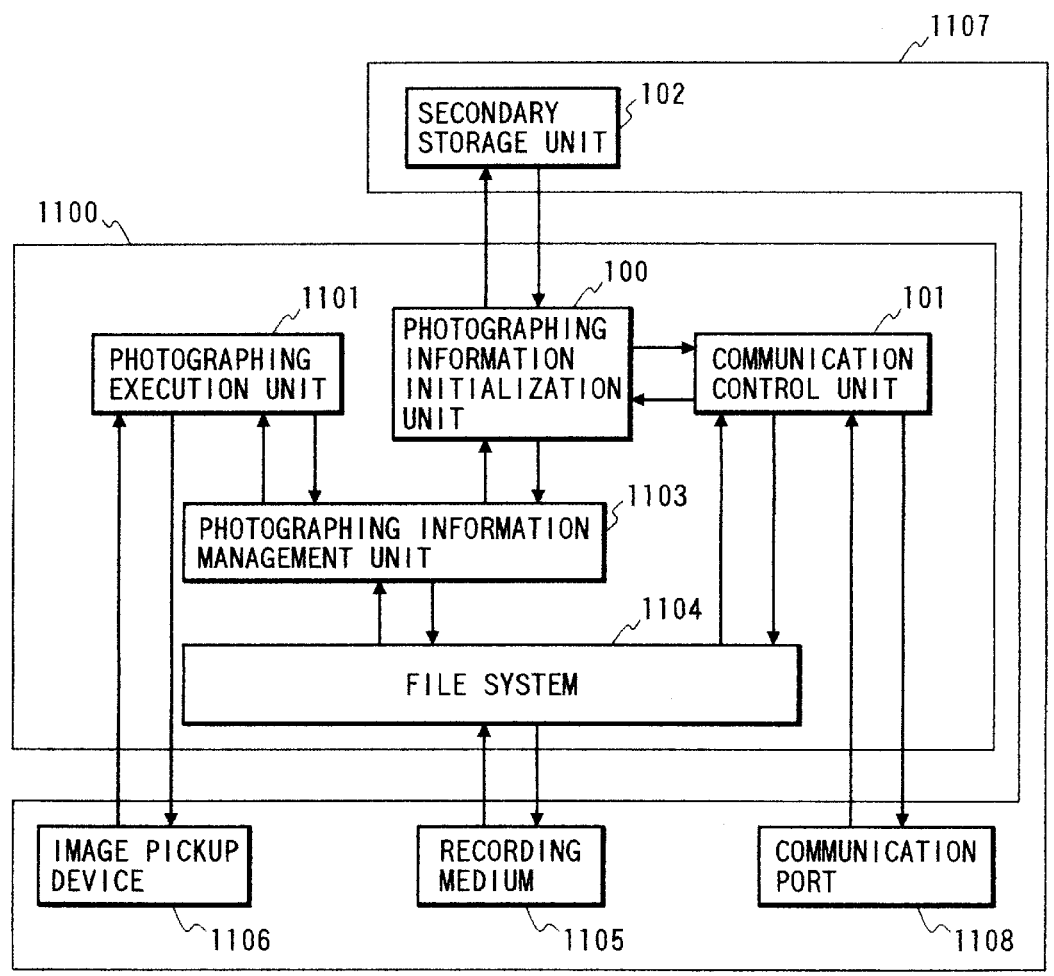
FIG. 1 shows an embodiment of the invention and is a block diagram showing a constructional example of main portions of a digital camera.
Figure 4:
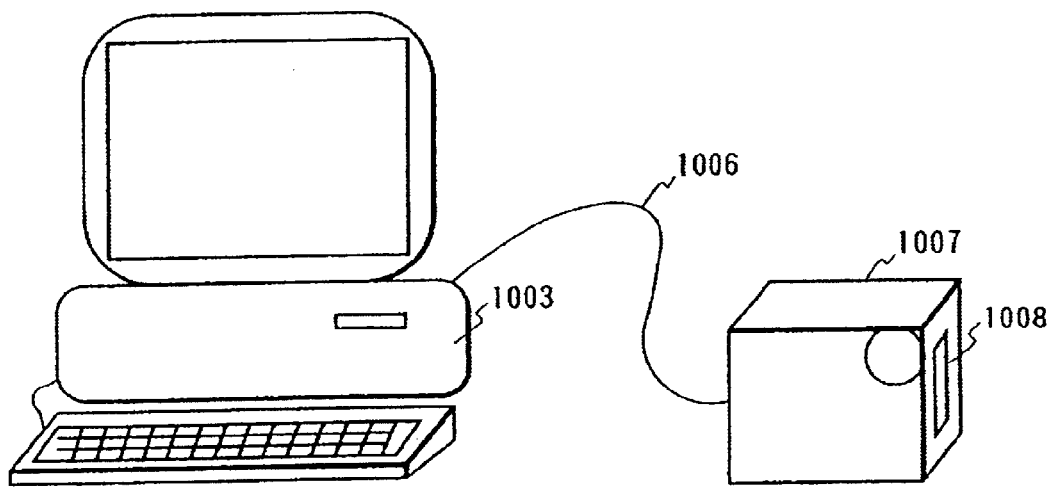
FIG. 4 is a diagram showing a digital camera system in which a digital camera and a digital camera control apparatus are connected.
Figure 5:
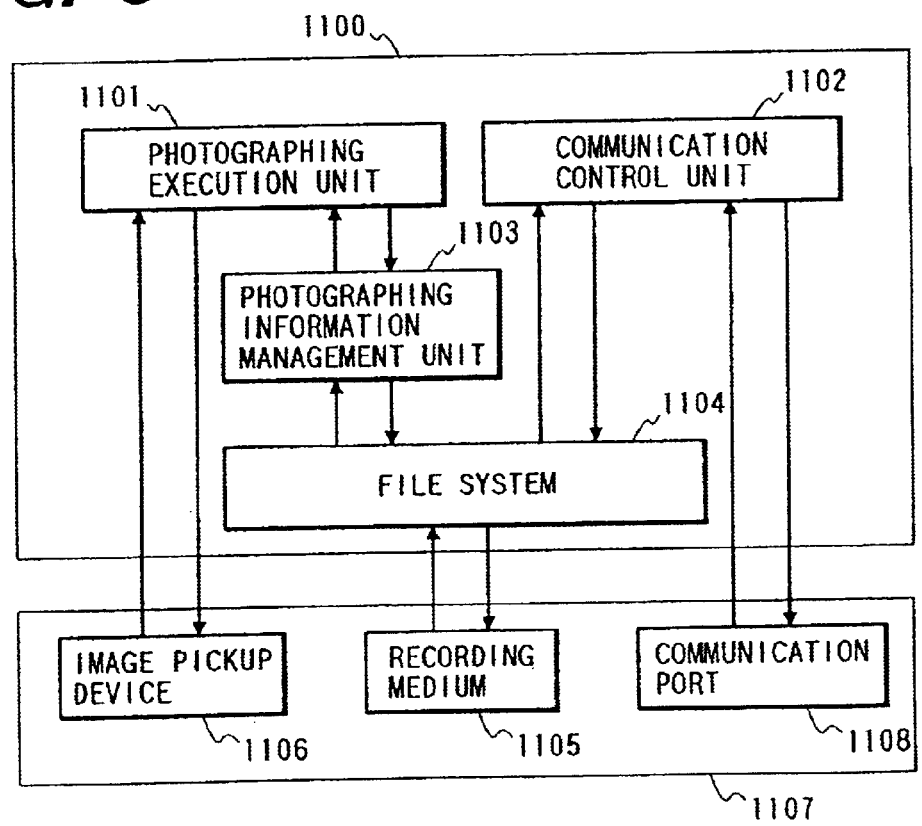
FIG. 5 is a block diagram showing a constructional example of a conventional digital camera.

FIG. 1 is a block diagram showing a constructional example of a digital camera according to an embodiment. In FIG. 1, blocks having the same functions as those in FIG. 5 are designated by the same reference numerals and their detailed descriptions are omitted. Only the main portions are shown. A digital camera control apparatus and a digital camera system in the present embodiment are constructed in a manner similar to those in FIG. 4 and are not shown.

In FIG. 1, reference numeral 102 denotes a secondary storage unit comprising a non-volatile memory or the like. The secondary storage unit 102 has a function to store a flag indicating that it is necessary to reflect the contents in the file system 1104 to the information which the photographing information management unit 1103 has and to match them. The flag is set when the contents in the recording medium 1105 are rewritten. The flag is cleared when the contents are reflected to the photographing information management unit 1103. The flag has been cleared in an initial state.

Reference numeral 101 denotes a communication control unit which functions such that a signal from the communication port 1108 is processed, and in accordance with a request from the PC (1003 in FIG. 4) connected to the communication port 1108, photographed images are read through the file system 1104 and transmitted, unnecessary images are deleted, or data sent from the PC is written.

Reference numeral 100 denotes a photographing information initialization unit which functions to update the information managed by the photographing information management unit 1103 in response to a request from the communication control unit 101, thereby preventing the occurrence of contradiction with a present state of the file system 1104. The photographing information initialization unit 100 functions to set or clear a flag indicating that it is necessary to reflect the contents in the file system 1104 to the information which the photographing information management unit 1103 has and to match them.

Figure 2:
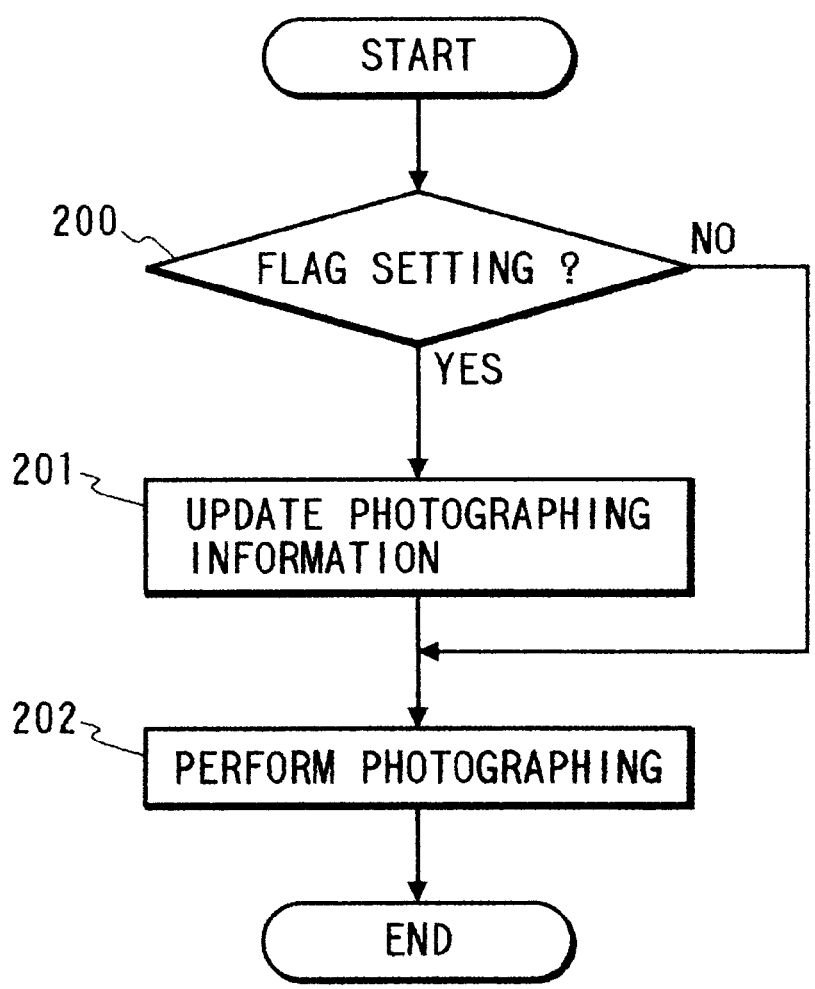
FIG. 2 is a flowchart showing the operation when the digital camera of the present embodiment performs a photographing operation.

The operation of a digital camera of the present embodiment will now be described. First, the operation when a photographing operation is performed will be explained. FIG. 2 is a flowchart for explaining the operation when performing a photographing operation.

When the operation is started, first in step 200, the photographing information initialization unit 100 refers to a setting status of the flag stored in the secondary storage unit 102. When the flag has been set, this means that the information of the photographing information management unit 1103 is contradictory to the file system 1104 as will be explained hereinlater. Therefore, in this case, the processing routine advances to step 201.

In step 201, the photographing information initialization unit 100 requests the photographing information management unit 1103 to update the photographing information.

When receiving the request from the photographing information initialization unit 100, the photographing information management unit 1103 updates the information which is managed by itself with reference to the file system 1104 in response to the request of the photographing initialization unit 100.

For example, the number of images which can be photographed and stored in the recording medium 1105, the numbers to be allocated to the names of the photographed images, and the like are updated. If the images having the names of Nos. 1 to 4 exist in the recording medium 1105, No. 5 is prepared as a number to be allocated to the name of the photographed image.

On the other hand, when it is determined in step 200 that the photographing information is not updated or when the process in step 201 is finished, the processing routine advances to step 202 and the photographing operation is executed. Specifically speaking, the photographing execution unit 1101 obtains the number of images which can be photographed from the photographing information management unit 1103, discriminates whether images can be recorded in the recording medium 1105 or not, and further, obtains the numbers to be allocated as names to the images and the like. After that, the image pickup device 1106 is driven and a photographing operation is performed. The electric signal obtained by the photographing operation is recorded as an image into the recording medium 1105.

The operation when the digital camera of the present embodiment communicates with an external digital camera control apparatus such as a PC or the like will now be described.

Figure 3:
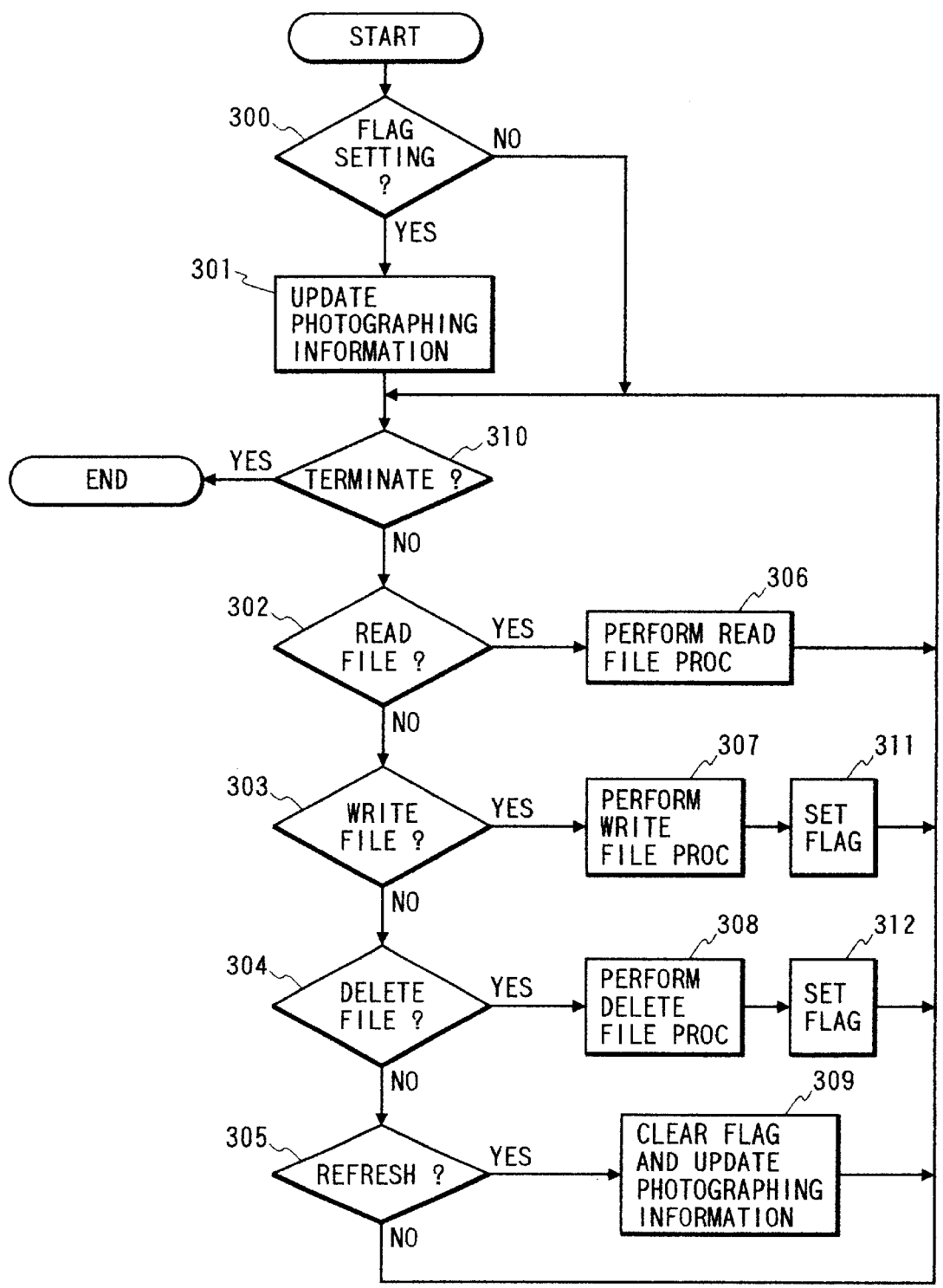
FIG. 3 is a flowchart showing the operation when the digital camera according to the present embodiment communicates with an external digital camera control apparatus connected thereto.

FIG. 3 is a flowchart showing the operation when the digital camera communicates with the external digital camera control apparatus.

When the operation is started, in first step 300, the photographing information initialization unit 100 discriminates whether the updating of the photographing information is request to the photographing information management unit 1103 or not with reference to the status of the flag stored in the secondary storage unit 102.

When the flag has been set in the secondary storage unit 102, step 301 follows and the photographing information initialization unit 100 requests the photographing information management unit 1103 to update the photographing information. Since this operation is the same as that in steps 200 and 201 in FIG. 2, its detailed description is omitted.

In the processes in step 310 and subsequent steps, a process corresponding to an instruction sent from an external digital camera control apparatus connected thereto is executed. This instruction is obtained by a method whereby the communication control unit 101 interprets the electric signal sent from the external digital camera control apparatus through the communication port 1108. In the present embodiment, five instructions are prepared.

First in step 310, a check is made to see if the instruction sent from the external digital camera control apparatus is "Terminate". "Terminate" is an instruction to finish the communication. Therefore, when the instruction sent from the external digital camera control apparatus is "Terminate", the communication control unit 101 finishes the communication in accordance with a predetermined operation.

In step 302, a check is made to see if the instruction sent from the external digital camera control apparatus is "Read File". "Read File" is an instruction to designate a file and to read the data such as an image or the like recorded in the recording medium 1105. When the instruction sent from the external digital camera control apparatus is "Read File", step 306 follows and the communication control unit 101 executes processes for reading out the file designated by "Read File" from the file system 1104 and for transmitting it to the external digital camera control apparatus through the communication port 1108.

On the other hand, when it is determined in step 302 that the instruction sent from the external digital camera control apparatus is not "Read File", step 303 follows. In step 303, a check is made to see if the instruction sent from the external digital camera control apparatus is "Write File". If YES, step 307 follows. "Write File" is an instruction to designate a file and to write it into the data recorded in the recording medium 1105.

In step 307, the communication control unit 101 writes through the file system 1104 to the file designated by the "Write File" instruction. After completion of the writing process, step 311 follows and the flag stored in the secondary storage unit 102 is set in order to show the necessity to update the photographing information for the photographing information initialization unit 100.

Different from "Read File", "Write File" is an instruction to rewrite the contents in the recording medium 1105. The "Write File" instruction can increase, for instance, the contents in the designated file and this results in a decrease in the number of images which can be photographed. In such a case, by setting the foregoing flag, it is shown that it is necessary to update the photographing information which is managed by the photographing information management unit 1103.

When it is determined in step 303 that the instruction is not "Write File", step 304 follows. In step 304, a check is made to see if the instruction sent from the digital camera control apparatus is "Delete File". If YES, step 308 follows. "Delete File" is an instruction for designating a file and for deleting the data recorded in the recording medium 1105. The "Delete File" instruction is also used to rewrite the contents in the recording medium 1105 in a manner similar to "Write File". Therefore, in subsequent step 312, the communication control unit 101 sets the flag in the secondary storage unit 102 into the photographing information initialization unit 100.

When it is decided in step 304 that the instruction is not "Delete File", step 305 follows. In step 305, a check is made to see if the instruction sent from the external digital camera control apparatus is "Refresh". If YES, step 309 follows.

"Refresh" is an instruction for reflecting the contents in the file system 1104 to the photographing information which is managed by the photographing information management unit 1103, thereby matching them. After the contents in the recording medium 1105 were rewritten, the external digital camera control apparatus has to send the "Refresh" instruction.

However, it is not always necessary to send the "Refresh" instruction each time the contents in the recording medium 1105 are rewritten. The "Refresh" instruction can be transmitted at an arbitrary timing after the contents were rewritten to a certain extent or the like. When the "Refresh" instruction is sent, the communication control unit 101 advances to step 309 and clears the flag stored in the secondary storage unit 102 for the photographing information initialization unit 100 in order to indicate the necessity of updating the photographing information. The photographing information initialization unit 100 allows the photographing information management unit 1103 to update the photographing information which is managed with reference to the file system 1104.

When the "Refresh" instruction is sent, the contents in the photographing information management unit 1103 and file system 1104 are matched. However, there is a case where the external digital camera control apparatus cannot transmit this instruction because of a reason such that the cable for communication to connect the digital camera and the digital camera control apparatus is disconnected or the like.

In such a case, since the flag in the secondary storage unit 102 is not cleared, as mentioned above, when the subsequent photographing or communication is started, the contents in the photographing information management unit 1103 are automatically updated in step 201 in FIG. 2 or in step 301 in FIG. 3.

In the present embodiment, if the "Refresh" instruction cannot be transmitted due to a reason such that the cable is disconnected or the like in spite of a fact that the external digital camera control apparatus connected thereto has rewritten the contents in the recording medium 1105, when the next photographing operation or communication is started, the photographing information management unit 1103 automatically matches with the contents in the file system 1104.

However, if the flag in the secondary storage unit 102 has been set after "Terminate" was received in step 310 in FIG. 3, the photographing information initialization unit 100 can also instruct the photographing information management unit 1103 to update the photographing information before the end of the communication.

In this case, when the photographing operation is started, it is unnecessary to perform the updating process of the photographing information in steps 200 and 201 in FIG. 2. Even when the communication is started, there is no need to perform the updating process of the photographing information in steps 300 and 301 in FIG. 3. Thus, when the next photographing operation or communication is started, the contents in the photographing information management unit 1103 and file system 1104 have been matched.

Other Embodiments of the Invention

The present invention can be applied to a system constructed by a plurality of equipment (for example, host computer, interface equipment, reader, printer, etc.) or can be also applied to an apparatus comprising one equipment.

An embodiment such that in order to make various devices operative so as to realize the functions of the foregoing embodiments, program codes of software for realizing the functions of the embodiments are supplied to a computer in an apparatus or system connected to those various devices and the invention is accomplished by making the various devices operative in accordance with a program stored in the computer (CPU or MPU) of the system or apparatus is also incorporated in the invention.

In this case, the program codes themselves of the software realize the functions of the foregoing embodiments. The program codes themselves and means for supplying the program codes to the computer, for instance, storage medium in which those program codes have been stored, construct the invention. As a storage medium to store those program codes, for example, it is possible to use a floppy disk, a hard disk, an optical disk, a magnetooptic disk, a CD-ROM, a magnetic tape, a non-volatile memory card, an ROM, or the like.

It will be understood that, not only in a case where the functions of the foregoing embodiments are realized by executing the supplied program codes using a computer, but also in a case where the functions of the foregoing embodiments are realized using the program codes in cooperation with the OS (operating system) which is running in the computer or another application software or the like, the above program codes are also incorporated in the present embodiment of the invention.

Further, a case where after the supplied program codes were stored in a memory provided for a function expansion board of a computer or a function expansion unit connected to the computer, a CPU or the like provided for the function expansion board or function expansion unit executes a part or all of the actual processes on the basis of instructions of the program codes, and the functions of the foregoing embodiments are realized by those processes is also obviously incorporated in the invention.

According to the present embodiment, when a contradiction with the contents in the recording means occurs or when there is a request from an external digital camera control apparatus connected thereto, the information holding means for holding the information regarding the recording means reflects the contents in the recording means and updates the information regarding the recording means, so that in the case of performing a photographing operation or other communication, the contents in the recording means always can be reflected to the information holding means. Thus, it is possible to construct an apparatus such that even after communicating with an external digital camera control apparatus connected thereto, no problem occurs in the photographing and recording operations of the image.

What is claimed is:

1. An imaging apparatus comprising:
    an imaging unit which generates image information;
    a file system unit which controls a writing operation of a storage device;
    a managing unit which detects a storage state of said storage device and manages writing of the image information generated by said imaging unit into said storage device in accordance with a storage state information indicating the detected storage state;
    a communication unit which receives information data to be written into said storage device from an external apparatus, said external apparatus writing the information data into said storage device independently of said managing unit; and
    a control unit which sets a flag indicating that the information data are written into said storage device independently of said managing unit in response to writing of the information data into said storage device by said external apparatus,
    wherein said managing unit updates the storage state information so that the storage state information matches the storage state of said storage device into which information data are written by said external apparatus in accordance with the flag set by said control unit.

2. An imaging apparatus according to claim 1, wherein said storage device is a memory card consisting of a semiconductor memory.

3. An imaging apparatus according to claim 1, wherein the storage state detected by said managing unit is vacant capacity information of said storage device and file number information to be written into said storage device next.

4. An imaging apparatus comprising:
    an imaging unit which generates image information;
    a file system unit which writes information into a storage device;
    a managing unit which holds storage state information indicating a storage state of said storage device and manages writing of the image information generated by said imaging unit into said storage device in accordance with the storage state information;
    a communication unit which receives a delete command of the image information stored in said storage device from an external apparatus said external apparatus being capable of deleting the image information from said storage device independently of said managing unit; and
    a control unit which sets a flag indicating that the image information is deleted from said storage device independently of said managing unit in response to the delete command received by said external apparatus
    wherein said managing unit updates the storage state information so that the storage state information matches the storage state of said storage device from which the image information is deleted by said external apparatus in accordance with the flag set by said control unit.

5. An apparatus according to claim 4, wherein said storage device is a memory card consisting of a semiconductor memory.

6. An apparatus according to claim 4, wherein the storage state detected by said managing unit is vacant capacity information of said storage device and file number information to be written into said storage device next.

* * * * *

UNITED STATES PATENT AND TRADEMARK OFFICE
CERTIFICATE OF CORRECTION

PATENT NO. : 6,822,678 B2 Page 1 of 1
DATED : November 23, 2004
INVENTOR(S) : Hatori It is certified that error appears in the above-identified patent and that said Letters Patent is hereby corrected as shown below:

Title page,
Before Item [21], Appl. No., the following should be inserted:
-- (*) Notice: This patent issued on a continued prosecution application filed under 37 CFR 1.53(d), and is subject to the twenty year patent term provisions of 35 U.S.C 154(a)(2). --.
Item [57], ABSTRACT,
Line 13, "is" should read -- are --.

Column 2,
Line 15, "has" should read -- have --.

Column 3,
Line 29, "adigital" should read -- a digital --.

Column 4,
Line 60, "request" should read -- requested --.

Column 6,
Line 65, "equipment." should read -- piece of equipment. --.

Column 7,
Line 15, "magnetooptic" should read -- magneto-optic --.

Column 8,
Line 44, "apparatus" should read -- apparatus, --.

Signed and Sealed this

Twenty-eighth Day of June, 2005

JON W. DUDAS
*Director of the United States Patent and Trademark Office*